UNITED STATES PATENT OFFICE.

ELLIOT SAVAGE, OF WEST MERIDEN, CONNECTICUT, ASSIGNOR TO ELLIOT SAVAGE, GEO. S. HARWOOD, AND GEO. H. QUINCY.

PROCESS OF ANNEALING STEEL AND OTHER METALS.

Specification forming part of Letters Patent No. 52,612, dated February 13, 1866.

*To all whom it may concern:*

Be it known that I, ELLIOT SAVAGE, of West Meriden, in the county of New Haven and State of Connecticut, have invented certain new and useful Improvements in Annealing Steel and other Metals; and I hereby declare that the following is a full, clear, and exact description of the same.

My invention relates to the annealing of steel or other metals; and in order that my new method may be the better understood I will explain briefly the old process of annealing and state the advantages which I obtain from my invention.

By the old method of annealing—steel, for example, has been heated in ordinary fires or furnaces, excluding the air as much as possible, but not entirely, and the result has been the surface of the steel has been oxidized, rendering the employment of acids to remove the scale absolutely needful before working—as, for instance, in the process of wire-drawing, the scale, being excessively hard, must be removed before the wire can be reduced in size by drawing.

My process consists in heating the metal to be annealed in a bath, such as cyanide of potassium heated to redness, or any other substance which allows of the heating of the metal without oxidizing, by the formation upon the surface of a film or coating whereby the metal is protected from the action of the air during the process of cooling. I allow the metal to remain in the bath until it attains about the same temperature as the bath, when it becomes soft, and after allowing the softened metal to cool sufficiently I submerge it in clear water, or, by preference, in a metallic solution, in order to remove from the surface of the softened metal any particles of the cyanide of potassium which may adhere from the heated bath.

Having thus described my invention, I claim—

1. The method of annealing steel or other metals, substantially as hereinbefore described— that is to say, by heating the same in a substance which shall form upon its surface a protecting coating or film soluble in water or metallic cooling solutions, as set forth.

2. The use of cyanide of potassium for the purpose of heating steel or other metals in the process of annealing.

3. The use of metallic solutions for the purpose of cooling steel or other metals in the process of annealing.

4. The employment, in the process of annealing, of cyanide of potassium as the heating medium, in combination with a metallic solution as the cooling medium.

In testimony whereof I have signed my name to this specification before two subscribing witnesses.

ELLIOT SAVAGE.

Witnesses:
WM. H. SWEETSER,
WM. J. QUINCY.